March 13, 1945. A. E. LORCH 2,371,530
PRODUCTION OF BUTADIENE
Filed March 4, 1943
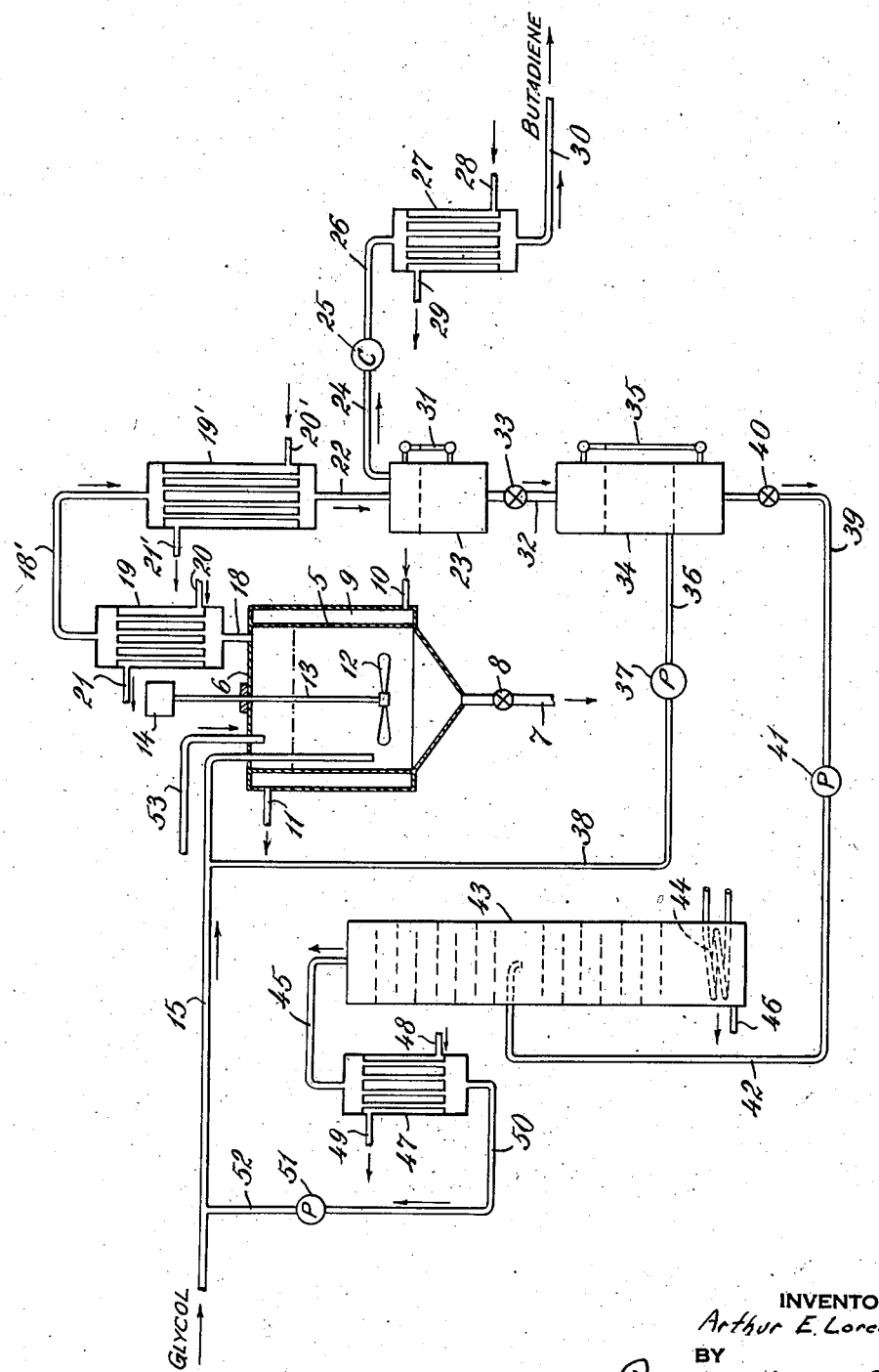
INVENTOR
Arthur E. Lorch.
BY
ATTORNEYS Patented Mar. 13, 1945

2,371,530

UNITED STATES PATENT OFFICE 2,371,530

PRODUCTION OF BUTADIENE

Arthur E. Lorch, Tenafly, N. J., assignor to Air Reduction Company, Incorporated, New York, N. Y., a corporation of New York Application March 4, 1943, Serial No. 477,939

8 Claims. (Cl. 260—681)

This invention relates to the production of 1,3-butadiene from 1,3-butylene glycol and particularly to an improved method affording a commercially practicable procedure for economical recovery of the desired product.

1,3-butadiene is derived from 1,3-butylene glycol by splitting off water in accordance with the following reaction:

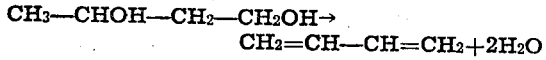

Numerous suggestions have been made concerning the practical application of this reaction. Most of these involve attempted dehydration of the butylene glycol in the vapor phase with the aid of suitable catalysts. The procedures as previously described result in excessive decomposition and clogging of the catalyst which must be revived frequently by burning in oxygen or air to remove carbon therefrom. The known methods are grossly inefficient and commercially impracticable, particularly with respect to the reduction of activity of the catalyst due to carbonization and the necessary repeated burning of the catalyst with resulting loss of activity.

It is the object of the present invention to prepare 1,3-butadiene from 1,3-butylene glycol in a simple, economical and efficient procedure suitable for commercial application.

Another object of the invention is the provision of a method which ensures prolonged activity of the catalyst with provision for renewal of the catalyst without interrupting the procedure.

Other objects and advantages of the invention will be apparent as it is better understood by reference to the following specification and the accompanying drawing, which illustrates diagrammatically an apparatus suitable for the practice of the invention.

I have discovered that butadiene can be produced advantageously by heating 1,3-butylene glycol in relatively low concentrations in an inert liquid including a dehydration catalyst and in the absence of substantial amounts of water in the liquid phase. The procedure requires the maintenance of a body of a suitable liquid at a temperature favorable to the reaction. The catalyst may be dissolved or suspended in the liquid. The glycol is introduced at substantially the rate at which conversion to butadiene occurs, so that no substantial amount of glycol remains at any time in the liquid. The resulting butadiene, being gaseous at the temperature of the reaction, is withdrawn continuously with other vapors arising from the body of liquid and is subsequently separated from such vapors.

The temperature of the liquid heating bath will depend somewhat upon the activity of the catalyst, the rate of feed and the kind of heating liquid used. Temperatures between 220° and 350° C. are most favorable for the reaction, and I prefer to conduct it within the range of 260°–285° C. If the temperature is as low as 200° C., the reaction becomes too slow to warrant commercial operation. If it is permitted to exceed 350° C., there is a tendency toward undesired side and decomposition reactions.

Many different types of liquids may be utilized in the heating bath. In general, the characteristics of such a liquid should be that it is inert under the conditions of operation, that is, that the liquid does not decompose and does not react with the butylene glycol, butadiene or any other products of the reaction or the catalyst employed during the dehydration of the 1,3-butylene glycol. The liquid should not have a boiling point below that of the reaction temperature, although such a liquid may be used, provided the reaction is conducted under pressure. Hence a liquid should be selected which does not boil at atmospheric pressure below the prevailing temperature.

It is not necessary that the heating liquid and butylene glycol should be completely miscible. As already indicated, the temperature of the heating liquid and the rate of feed of butylene glycol are adjusted so that there is no accumulation of butylene glycol in the heating liquid during the operation. It is believed that slight solubility of the butylene glycol in the heating liquid, of the order of 1% or less, is favorable to the reaction, but in this respect I do not wish to be restricted to any particular theory.

Among the liquids which are suitable for use as heating liquids, I have employed the following: diphenyl ethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260–270° C., Bunker C oil and a higher alcohol known to the trade as "cyclic $C_{18}$ alcohol." It will be observed that the chemical composition of the bath liquid may differ markedly. The essential characteristics have been indicated. Undoubtedly a considerable number of additional materials having similar characteristics and therefore available for the purpose could be selected.

As the catalyst, I prefer to employ "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the heating bath at the temperature maintained cannot be determined accurately. Any of the phosphates mentioned or the resulting products in the heating bath are active catalysts for the reaction.

The catalyst may be introduced to the heating bath as such, but I prefer to mount it on a suitable finely divided support such as carbon, coke, "Filtercel," "Celite," kaolin or clays and the like. The supported catalyst may be prepared in any of the well known ways, for example, by evaporation to dryness of an aqueous solution of the phosphate in contact with the finely divided supporting material while the solution is stirred to ensure uniform impregnation of the support. For example, 6 parts by weight of di-ammonium phosphate are dissolved in about 50 parts of water and added to 12 parts of "Filtercel." The mass is evaporated to dryness with continuous stirring.

The use of a mounted catalyst in general results in more efficient operation. The unmounted catalyst has a tendency to coalesce when suspended in the heating liquid. If mounted as described, it can be maintained in suspension and uniformly distributed throughout the heating liquid. Preferably the heating liquid should be agitated to maintain the desired suspension and consequently uniform contact of the glycol with the catalyst in the heating liquid. While ammonium phosphate is preferred as a catalyst for the reaction, various other catalysts are available and can be used. Among them are phosphoric acid, toluene sulfonic acid, ammonium sulphate, a mixture of calcium and ammonium phosphates, anilin phosphate, acid sodium phosphate, kaolin and clays such as Attapulgus clay. Such catalysts may be used as such or mounted on supports as in the case of ammonium phosphate. The catalyst so used in the heating liquid will afford satisfactory yields.

The proportion of catalyst is largely dependent upon the catalytic area exposed. If the catalytic material is finely divided, less of it is required. Experience has shown that when the catalyst is in relatively large pieces, say 4–8 mesh, it may be necessary to employ 50% by weight based upon the heating liquid. If, however, the catalyst is finely divided, an amount of 2% by weight of the liquid or even less is required to ensure adequate activity. The fineness of the catalyst and the proportion thereof can be varied within wide limits to secure the desired result.

The procedure will be readily understood by reference to the drawing, it being understood that the apparatus described is merely illustrative of suitable equipment for the purpose. The reactor 5 is a receptacle having a closure 6 and an outlet 7 controlled by a valve 8. A heating jacket 9 is adapted to be supplied through a pipe 10 with a suitable heating liquid which escapes through the pipe 11 and is reheated for circulation through the jacket. Any suitable heating liquid adapted to be maintained at the desired temperature may be employed. "Dowthern" is well adapted for the purpose, since it may be readily maintained at the desired temperature to heat the body of liquid within the reactor 5. An agitator 12 is supported on a shaft 13 and is adapted to be driven from any suitable source such as a motor 14 to maintain the desired agitation during the reaction.

The reactor 5 is partially filled with the selected heating liquid in which the catalyst is suspended or dissolved. Glycol is introduced through a pipe 15 from any suitable source of supply at substantially the rate of reaction. The glycol enters beneath the surface of the liquid in the reactor and immediately is raised to the temperature of the heating liquid while it is brought into contact with the catalyst. As the result, butadiene is produced and escapes, together with water vapor formed as the result of the reaction, some unreacted or partially reacted glycol, and possibly some entrained heating liquid, through a pipe 18. The vapors pass to a reflux condenser 19. Cooling water is supplied through a pipe 20 and escapes through a pipe 21. The unreacted glycol and any of the bath liquid return through the pipe 18 to the reactor. The remaining vapors are delivered by a pipe 18' to a condenser 19' supplied with cooling water which circulates through pipes 20' and 21'. The condensate, consisting of water and partially reacted glycol or butenol is delivered by a pipe 22 to a collector 23. The butadiene escapes through a pipe 24 and may be delivered to a gasometer (not shown). Preferably it is compressed in a compressor 25 to a pressure at which it will liquefy at atmospheric temperature. It is delivered then through a pipe 26 to a condenser 27. Cooling water is supplied through a pipe 28 and escapes through a pipe 29. The condensed butadiene is withdrawn through a pipe 30.

The level of the condensed liquid in the collector 23 may be observed through a sight glass 31 and as desired it may be delivered through a pipe 32 controlled by a valve 33 to a separator 34. Usually the liquid separates in two levels, the upper level consisting principally of partially reacted glycol. A sight glass 35 permits observation of the liquid levels. The upper layer may be withdrawn through a pipe 36 and delivered by a pump 37 and pipe 38 to the pipe 15 through which it is returned to the reactor 5.

The liquid in the bottom of the separator 34 is water with some partially reacted glycol or butenol. This liquid may be withdrawn through the pipe 39 controlled by a valve 40 and delivered by a pump 41 through a pipe 42 to a column 43. Heat is supplied at the bottom of the column by a steam coil 44. Rectification in the column results in an effluent consisting of partially reacted glycol and water which escapes through a pipe 45. The bulk of the water is withdrawn at the bottom of the column through a pipe 46. The effluent is delivered to a condenser 47 cooled by water supplied by a pipe 48 and escaping through a pipe 49. The condensate is withdrawn through a pipe 50 and delivered by a pump 51 and pipe 52 to the pipe 15 and is thus returned to the reactor 5.

If the activity of the catalyst in the reactor 5 is decreased after long use, it is sufficient merely to withdraw a portion of the heating liquid through the outlet 7 with the dissolved or suspended catalyst therein. Fresh heating liquid with new or revived catalyst can be introduced through a pipe 53 without interfering with the operation of the method. If the catalyst is suspended rather than dissolved, it can be separated readily from the withdrawn portion of the heating liquid by filtration, settling or centrifuging. Fresh catalyst can be added to the clarified liquid, and the latter may be utilized in the reaction. If desired, the renewal of the catalyst may be accomplished as a continuous operation, a small amount of liquid being continuously withdrawn and liquid with fresh catalyst being continuously added. If the catalyst is dissolved rather than suspended, it may be separated by precipitation through the addition of a proper reagent or by any other suitable means. The heating liquid is in general so inexpensive that if desired withdrawn portions can be discarded.

The practical operation of the invention will be readily understood from the following examples:

Example I 300 parts of diphenyl ethane and 12 parts of finely divided diammonium phosphate were placed in the reactor. The temperature of the diphenyl ethane was maintained at 255°–265° C., and 1,3-butylene glycol was introduced below the liquid level at the rate of approximately 9 parts per hour while the liquid was agitated. The butadiene was separated and recovered as hereinbefore described. The volume of gas so collected was determined, and samples were withdrawn and analyzed for butadiene content. The converison of the input butylene glycol to butadiene was 75%, and the gas produced was 94%–96% butadiene.

Example II

The operation as described in Example I was repeated, the butylene glycol being introduced at the rate of 16 parts per hour. During a period of operation approximating 400 hours about 133 parts of liquid containing suspended catalyst were removed from the bath and replaced with liquid containing 6 parts of fresh diammonium phosphate. From 75% to 77% of the input butylene glycol was converted to butadiene having a purity of 95%–96%, and there was no diminution of activity at the end of the test period.

Example III

In this operation 300 parts of Texas Co. #531 wash oil and 6 parts of diammonium phosphate mounted on 12 parts of finely divided coke were used in the reactor. At a temperature of about 280° and with a butylene glycol feed of approximately 16 parts per hour, butadiene of a purity of 95% was produced at a conversion of 79%.

Example IV

In this operation 250 parts of a higher alcohol known to the trade as "C18 alcohol" and 3 parts of 85% orthophosphoric acid were used. The bath was heated to 250–260° C., and about 16 parts per hour of butylene glycol were introduced into the liquid bath. 25% of the glycol so fed was converted to butadiene, the gas collected having a butadiene content of 66%.

Example V

In this operation 250 parts of Texas Co. #531 wash oil and 6 parts anilin phosphate prepared by mixing anilin and phosphoric acid in the ratio of 2 mols of anilin to 1 mol of orthophosphoric acid were used as the heating bath and catalyst. With the bath at 255°–265° C., and a butylene glycol feed of about 16 parts per hour, a conversion of butylene glycol to butadiene of 65%–68% with the production of a gas containing 92% butadiene were obtained.

Example VI 250 parts of Texas Co. #531 wash oil containing 8 parts of a catalyst composed of diammonium phosphate mounted on "Filtercel" as a reaction medium were used. At a temperature of about 265° C., butadiene was produced in a yield of 89.4% of theory with a gas purity of 95%.

The foregoing examples are merely illustrative of the various modifications which can be made in the operation of the invention. Success in the procedure does not depend upon the selection of a specific heating medium or upon the use of a specific catalyst. The important criteria of the invention are the maintenance of a heating bath at a suitable temperature with a suitable catalyst distributed therein and the introduction of the glycol at a rate such that it is converted to butadience substantially as it is introduced. Any dehydration catalyst which will maintain its activity under the conditions of the reaction likewise may be used. The invention is limited, therefore, only with respect to the essential conditions of operation as hereinbefore set forth.

Various changes may be made in the apparatus employed and in the details of procedure without departing from the invention or sacrificing the advantages thereof.

I claim:

1. The method of producing 1,3-butadiene by dehydration of 1,3-butylene glycol which comprises maintaining a body of inert organic liquid containing a dehydrating catalyst at a temperature between 220° and 350° C., feeding the glycol thereto at substantially the rate at which conversion to butadiene occurs, withdrawing vapor from the body of liquid and separating butadiene from the vapor.

2. The method of producing 1,3-butadiene by dehydration of 1,3-butylene glycol which comprises maintaining a body of inert organic liquid containing a dehydrating catalyst at a temperature between 220° and 350° C., feeding the glycol thereto substantially at the rate at which conversion to butadiene occurs, withdrawing vapor from the body of liquid, condensing the vapor and separating butadiene from the condensate.

3. The method of producing 1,3-butadiene by dehydration of 1,3-butylene glycol which comprises maintaining a body of inert organic liquid containing a dehydrating catalyst at a temperature between 220° and 350° C., feeding the glycol thereto substantially at the rate at which conversion to butadiene occurs, withdrawing vapor from the body of liquid, condensing the vapor, separating butadiene from the condensate and returning a portion of the condensate for further treatment with additional glycol.

4. The method of producing 1,3-butadiene by dehydration of 1,3-butylene glycol which comprises maintaining a body of inert organic liquid containing a dehydrating catalyst at a temperature between 220° and 350° C., feeding the glycol thereto substantially at the rate at which conversion to butadiene occurs, withdrawing vapor from the body of liquid, condensing the vapor, separating butadiene from the condensate, separating the condensate into oily and watery layers, removing water from the watery layer and returning the oily layer and the residue freed from water for further treatment with additional glycol.

5. The method of producing 1,3-butadiene by dehydration of 1,3-butylene glycol which comprises maintaining and agitating a body of inert organic liquid with a dehydration catalyst suspended therein at a temperature between 220° and 350° C., feeding the glycol thereto at substantially the rate at which conversion to butadiene occurs, withdrawing the vapor from the body of liquid, and separatting butadiene from the vapor.

6. The method of producing 1,3-butadiene by dehydration of 1,3-butylene glycol which comprises maintaining and agitating a body of inert organic liquid with a dehydration catalyst supported on a carrier and suspended therein at a temperature between 220° and 350° C., feeding the glycol thereto at substantially the rate at which conversion to butadiene occurs, withdrawing the vapor from the body of liquid, and separating butadiene from the vapor.

7. The method of producing 1,3-butadiene by dehydration of 1,3-butylene glycol which comprises maintaining a body of inert organic liquid containing a dehydrating catalyst at a temperature between 260° and 285° C., feeding the glycol thereto at substantially the rate at which conversion to butadiene occurs, withdrawing vapor from the body of liquid and separating butadiene from the vapor.

8. The method of producing 1,3-butadiene by dehydration of 1,3-butylene glycol which comprises maintaining a body of inert organic liquid containing a dehydrating catalyst at a temperature between 260° and 285° C., feeding the glycol thereto substantially at the rate at which conversion to butadiene occurs, withdrawing vapor from the body of liquid, condensing the vapor and separating butadiene from the condensate.

ARTHUR E. LORCH.